(12) United States Patent
Hinque

(10) Patent No.: US 9,061,556 B2
(45) Date of Patent: Jun. 23, 2015

(54) AIR MAINTENANCE PNEUMATIC TIRE

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 397 days.

(21) Appl. No.: 13/711,953

(22) Filed: Dec. 12, 2012

(65) Prior Publication Data

US 2014/0158266 A1 Jun. 12, 2014

(51) Int. Cl.
*B60C 23/12* (2006.01)
*B60C 29/04* (2006.01)
*B60C 29/00* (2006.01)

(52) U.S. Cl.
CPC ......... *B60C 23/12* (2013.01); *Y10T 152/10495* (2015.01); *B60C 29/04* (2013.01); *B60C 29/00* (2013.01)

(58) Field of Classification Search
CPC ........ B60C 23/10; B60C 23/12; B60C 29/00; B60C 29/04
USPC .......... 152/415, 418, 419, 423, 424, 425, 426
See application file for complete search history.

(56) References Cited

U.S. PATENT DOCUMENTS

| 7,225,845 | B2* | 6/2007 | Ellmann ........................ 152/426 |
| 2011/0146867 | A1* | 6/2011 | Benedict ...................... 152/426 |
| 2011/0146868 | A1* | 6/2011 | Losey et al. .................. 152/426 |
| 2011/0272073 | A1* | 11/2011 | Losey ......................... 152/340.1 |
| 2012/0160386 | A1* | 6/2012 | Hinque et al. ............... 152/429 |
| 2012/0241064 | A1* | 9/2012 | Hinque et al. ............... 152/418 |
| 2014/0000778 | A1* | 1/2014 | Gobinath ...................... 152/450 |
| 2014/0020805 | A1* | 1/2014 | Gobinath et al. ............. 152/450 |

FOREIGN PATENT DOCUMENTS

| DE | 3433318 A1 * | 3/1986 |
| EP | 2338703 | 6/2011 |
| EP | 2565061 | 3/2013 |
| EP | 2679413 | 1/2014 |

* cited by examiner

*Primary Examiner* — Kip T Kotter
(74) *Attorney, Agent, or Firm* — David L. King

(57) ABSTRACT

The present invention is directed to a pneumatic tire with an elongate substantially annular air passageway enclosed within a bending region of the tire and extending substantially in a circumferential direction, wherein upon rolling of the tire air is pressed through the air passageway and a valve assembly in air flow communication with the tire cavity, the annular air passageway and the exterior of the tire and having an air inlet for allowing air to enter the valve assembly from the exterior of the tire as well as an air outlet for allowing air to enter the tire cavity.

18 Claims, 8 Drawing Sheets

AIR MAINTENANCE PNEUMATIC TIRE

FIELD OF THE INVENTION

The present invention relates to a pneumatic tire, in particular to an air maintenance pneumatic tire or a self-inflating tire and more specifically to a tire with an integrated pump assembly.

BACKGROUND OF THE INVENTION

Normal air diffusion reduces tire pressure over time so that the tire becomes under inflated. Accordingly, drivers must repeatedly act to maintain tire pressure or will face reduced fuel economy, tire life and reduced vehicle performance. Tire pressure monitoring systems have been proposed to warn drivers when tire pressure is significantly low. Such systems, however, remain dependent upon the driver taking action to re-inflate the tire to a recommended pressure.

European patent application EP 2 338 703 A2 discloses a self-inflating tire assembly having an air tube circumferentially arranged in the tire's sidewall with an air inlet device and an air outlet device allowing the tire's inflation upon bending of the tire's sidewall.

A challenge has been presented to provide an improved air maintenance tire which does not require the driver's attention for maintaining a recommended inflation pressure.

A further challenge has been presented to provide a compact self-inflating tire assembly.

A further challenge has been presented to provide an improved air maintenance tire which may maintain inflation independent of the tire's rolling direction.

SUMMARY OF THE INVENTION

In an example, the present invention relates to a pneumatic tire comprising a tire cavity, first and second sidewalls extending respectively from first and second tire bead regions to a tire tread region, and an elongate substantially annular air passageway enclosed within a bending region of the tire and extending substantially in a circumferential direction of the tire, wherein upon rolling of the tire air is pressed through the air passageway. Further, the tire comprises a valve assembly in air flow communication with the tire cavity, the annular air passageway and the exterior of the tire, wherein the valve assembly comprises one or more of the following elements: an air inlet for allowing air to enter the valve assembly from the exterior of the tire; an air outlet for allowing air to enter the tire cavity; a first valve interposed in the air flow of the air passageway, the first valve having a first position allowing air to enter the air passageway through the air inlet in a first flow direction and a second position allowing air to enter the air passageway through the air inlet in a second flow direction opposite to the first direction; and a second valve interposed in the air flow of the air passageway in parallel to the first valve (or connected in parallel to the first valve to the air passageway), wherein when the first valve is in the first position, the second valve is in a third position allowing air flowing through the air passageway in the first flow direction to exit the air passageway through the air outlet, and wherein when the first valve is in the second position, the second valve is in a fourth position allowing air flowing through the air passageway in the second flow direction to exit the air passageway through the air outlet.

According to an example aspect of the invention, the air passageway extends annularly within the tire's sidewall or bead region.

According to another example aspect of the invention, the tire or the valve assembly comprises a valve body housing, wherein the first valve and the second valve are arranged in the valve body housing.

According to another example aspect of the invention, the air outlet and/or the air inlet is also arranged in the valve body housing.

According to yet another example aspect of the invention, the valves change between the first, second, third or fourth position self-reliantly in dependency of the direction of the air flow through the air passageway dictated by the rolling direction of the tire. However, all valves could also be actuated electrically.

According to yet another example aspect of the invention, the valve assembly extends through the tire's sidewall or bead region.

According to yet another example aspect of the invention, the first valve comprises a chamber having a first opening in air flow communication with the air inlet and a second opening in air flow communication with a first end of the annular passageway and a third opening in air flow communication with the second end of the annular passageway. Further, the first valve may comprise a piston element adapted and arranged to move between a first state blocking air flow through the second opening and allowing air flow from the first opening through the third opening and a second state blocking air flow through the third opening and allowing air flow from the first opening through the second opening.

According to yet another example aspect of the invention, the chamber and the piston element have each a substantially elongate cylindrical shape, the piston element being movable along its elongate axis, and wherein the second and the third openings are arranged at opposite end regions of the chamber and wherein the first opening is arranged in a sidewall of the chamber.

According to yet another example aspect of the invention, the piston element has an elongate cylindrical central portion and two essentially plate-shaped end portions extending radially from the cylindrical central portion, the plate-shaped end portions being sized to block air flow through the second or third opening.

According to yet another example aspect of the invention, the chamber encompasses and guides the central cylindrical portion along its elongate direction, the central cylindrical portion comprising grooves extending along the elongate direction, and wherein the chamber comprises a channel allowing air flow to pass from the first opening into the grooves. Alternatively, the chamber may comprise grooves extending along the elongate direction.

According to yet another example aspect of the invention, one plate-shaped end portion closes the second opening but allows air flow from the first opening through the third opening when the first valve is in a first state, whereas, when the first valve is in a second state, the second plate-shaped end portion closes the third opening but allows air flow from the first opening through the second opening.

According to yet another example aspect of the invention, the chamber comprises at each of its end regions a seat for accommodating a plate-shaped end portion of the piston element such that, when the first valve is in the first state, one plate-shaped end portion sits in a first seat thereby closing the second opening but allowing air flow from the first opening through the third opening, whereas, when the first valve is in the second state, the second plate-shaped end portion sits in a second seat thereby closing the third opening but allowing air flow from the first opening through the second opening.

According to yet another example aspect of the invention, the second opening is in direct air flow communication with the first end of the air passageway and wherein the third opening is in direct air flow communication with second end of the air passageway. In particular, in direct air flow communication may mean that no other elements, as e.g. further valves, are arranged in the air flow.

According to yet another example aspect of the invention, the second valve comprises on the one hand a second chamber having a fourth opening in air flow communication with the air outlet and a fifth opening in air flow communication with the second opening of the first valve and a sixth opening being in air flow communication with the third opening of the first valve, and on the other hand a closing element adapted and arranged to move between a third state closing the fifth opening and allowing air flow from the sixth opening through the fourth opening and a fourth state closing the sixth opening and allowing air flow from the fifth opening through the fourth opening.

According to yet another example aspect of the invention, the second valve comprises a substantially cylindrical chamber encompassing the closing element, wherein the closing element has a cylindrical shape or a ball shape.

According to yet another example aspect of the invention, the first valve comprises a chamber having a first opening in air flow communication with the air inlet and a second opening in air flow communication with a first end of the annular passageway and a third opening in air flow communication with the second end of the annular passageway. Further, the first valve may comprise a piston element adapted and arranged to move between a first state blocking air flow through the second opening and allowing air flow from the first opening through the third opening and a second state blocking air flow through the third opening and allowing air flow from the first opening through the second opening. In addition, the second valve may comprise a second chamber having a fourth opening in air flow communication with the air outlet and a fifth opening in air flow communication with the second opening of the first valve and a sixth opening being in air flow communication with the third opening of the first valve. Moreover, the second valve may comprise a closing element adapted and arranged to move between a third state closing the fifth opening and allowing air flow from the sixth opening through the fourth opening and a fourth state closing the sixth opening and allowing air flow from the fifth opening through the fourth opening.

According to yet another example aspect of the invention, the second opening is in direct air flow communication with the fifth opening and wherein the third opening is in direct air flow communication with the sixth opening.

According to yet another example aspect of the invention, the fifth opening is in direct air flow communication with the first end of the air passageway and wherein the sixth opening is in direct air flow communication with the second end of the air passageway.

According to yet another example aspect of the invention, the annular air passageway consists of a tube comprising rubber material and having a clear diameter of less than 3 mm.

According to yet another example aspect of the invention, the air outlet comprises an anti-return valve avoiding pressure drop in the tire cavity.

All features of the above described aspects of the invention may be combined or replaced with one another.

BRIEF DESCRIPTION OF THE DRAWINGS

In the following, we briefly describe the figures according to the embodiments of the present invention. Further details are given in the detailed description of the embodiments. The Figures have the purpose of illustrating the invention and should not be understood in a limiting sense.

DETAILED DESCRIPTION OF THE DRAWINGS

Figure 1:
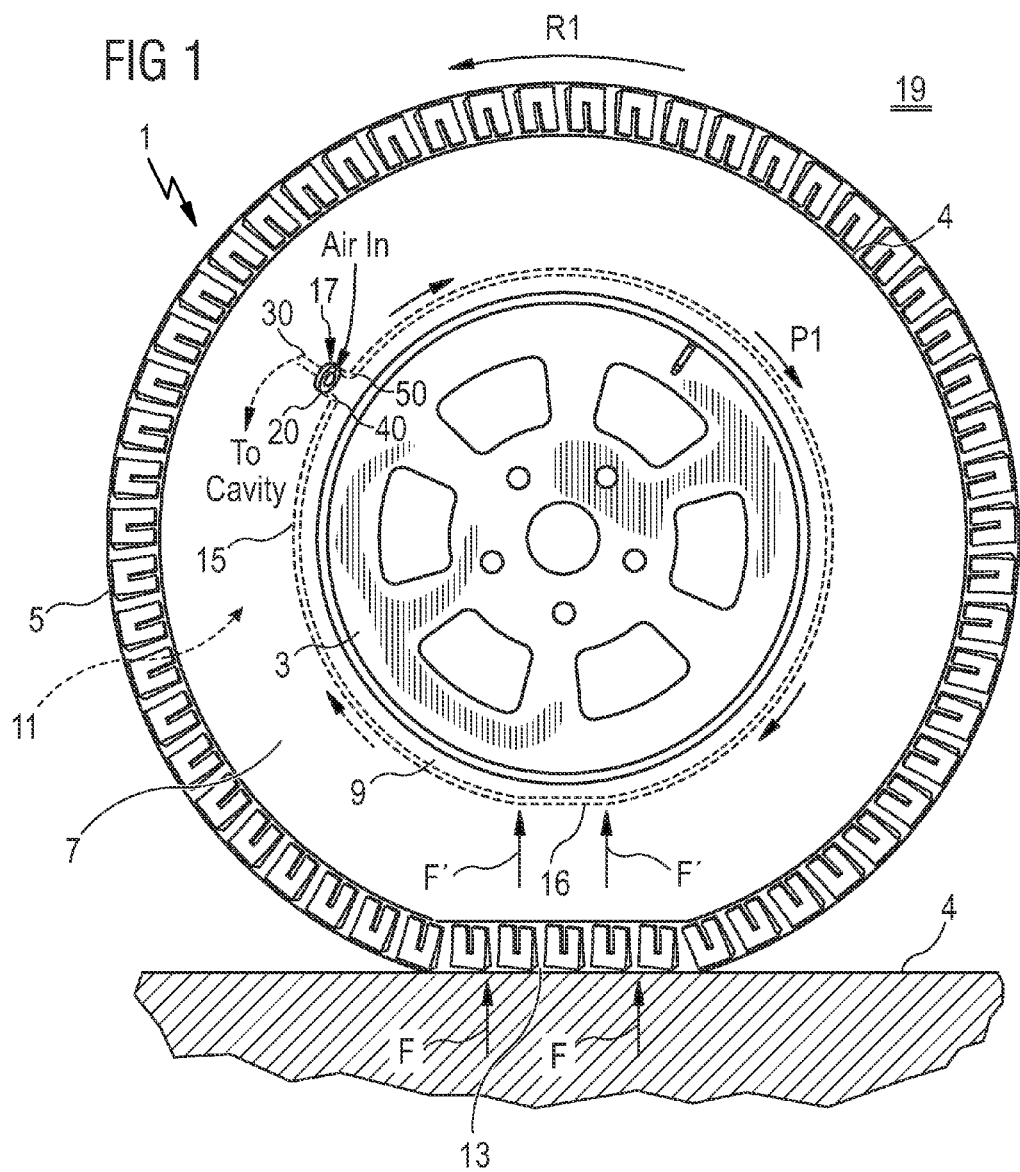
FIG. 1 shows a schematic side view of a rolling air maintenance tire according to an example of the invention.

FIG. 1 shows a schematic side view of a pneumatic tire 1 mounted on a rim 3. The tire 1 is rolling on the ground 4 in rolling direction R1 and has a pair of sidewalls 7 extending to a tread 5 and enclosing a tire air cavity 11 which may be defined by an innerliner layer 4 of the tire 1.

Upon contact with the road, the tire creates a footprint 13 against the surface 4 which in turn generates a compression force F on the tire 1. This compression force F results in deformation or bending of different regions in the tire 1. For example, the tire's tread 5 is bent or deformed. The same applies to the sidewalls 7 and, in particular, to the sidewall 7 near the tire's bead or bead region 9.

The tire 1 depicted in FIG. 1 comprises further an essentially annular air passageway 15 which is exemplarily arranged in the tire's sidewall 7 in a circumferential direction. The air passageway 15 is formed by a tube-like channel 15 extending through the sidewall 7. Further, a valve assembly 17 is interposed in the passageway 15 or interconnected with two ends of the passageway 15. The valve assembly 17 comprises an air inlet 20 in fluid communication with the tire's environment 19 and an air outlet 30 in fluid or air flow communication with the tire cavity 11. In addition, the valve assembly 17 is fluidly connected to a first end of the air passageway 15 and a second end of the air passageway 15. In other words, the valve assembly 17 may have four ports 20, 30, 40 and 50 for communicating air between the environment 19 and the tire cavity 11.

In the example shown in FIG. 1, the passageway 15 rotates with the tire in the direction of rotation R1. Due to the deformation of the tire 1 in the footprint region 13, the air passageway 15 is squeezed or deformed by the force F' in a portion 16 substantially above the footprint region 13. This deformation results in pumping or conveying air through the passageway 15 in a direction P1 opposite to the rolling direction R1. Thus, on the one hand, air in the passageway 15 is pressed into the port 40 of the valve assembly and guided into the tire cavity 11. On the other hand, air is sucked through the air inlet 20 into the valve assembly and guided through the port 50 into the air passageway 15. In particular, by the tire's rolling movement, a reduced pressure occurs in the passageway 15 in a portion between the port 50 and the region of deformation 16 of the passageway 15.

Further details regarding example embodiments of the valve assembly 17 are described below with respect to FIGS. 6 to 10.

Figure 2:
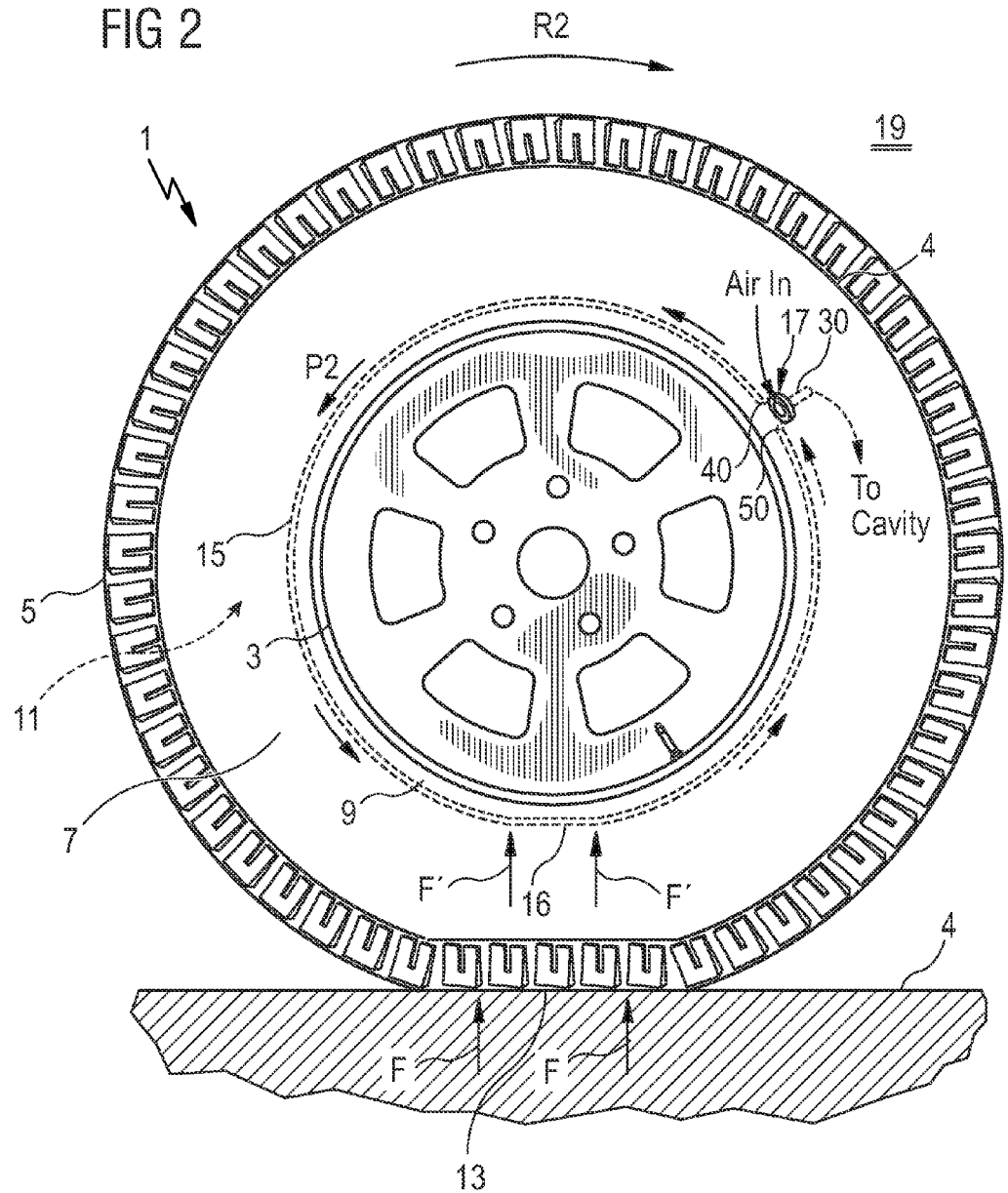
FIG. 2 shows a schematic side view of the tire according to FIG. 1, rolling in a reverse direction.

FIG. 2 shows the tire 1 of FIG. 1, wherein equal elements are described by the same reference numerals. In contrast to the situation depicted in FIG. 1, the tire 1 depicted in FIG. 2 rotates in an opposite direction of rotation R2. Consequently, the air passageway 15 mounted to the tire 1 rotates also in an opposite direction P2 with respect to the situation shown in FIG. 1. Again the valve assembly 17 pumps air into the tire cavity 11 driven by the deformation of the air passageway 15 near the footprint region 13. Air is forced through the air passageway 15 and into the tire cavity 11 through the air outlet 30 of the valve assembly 17. Further, air is sucked through the air inlet 20 into the valve assembly 17 and guided into the air passageway 15. Compared to the situation in FIG. 1, the ports 40 and 50 have changed their function. According to FIG. 1, port 40 guides air from the air passageway 15 into the valve assembly 17, whereas port 50 guides air from the valve assembly 17 into the low pressure portion of the air passageway 15. In reverse rolling direction, however, port 50 guides compressed air from the air passageway 15 into the valve assembly 17, whereas port 40 guides air from the valve assembly 17 into the low pressure portion of the air passageway 15.

Thus, the tire 1 according to the depicted embodiment may act as a peristaltic pump assembly allowing a bi-directional pumping of air into the tire, independent of the tire's rolling direction. In other words, the tire 1 may be self-inflated by rolling and the resulting deformation of the tire 1.

Further, the described pumping mechanism allows for maintaining a tire's cavity pressure on a recommended or prescribed value and may thus assure an optimal pressure and thus low fuel consumption.

Further, damages of the tire or risk for passengers due to an underinflated tire may be avoided. Continued checks of the tire's exact inflation pressure may be reduced or omitted.

The possibility of bi-directional pumping may be of particular advantage if vehicles move frequently in forward and backward directions, as for example industrial vehicles.

Moreover, in case of tires which may be mounted in two directions of rotation or either on the left hand side or on the right hand side of the vehicle, the suggested tire 1 will maintain inflation independent of the mounting orientation. Mistakes due to a false mounting direction with regard to the pumping mechanism are avoided.

Figure 3:
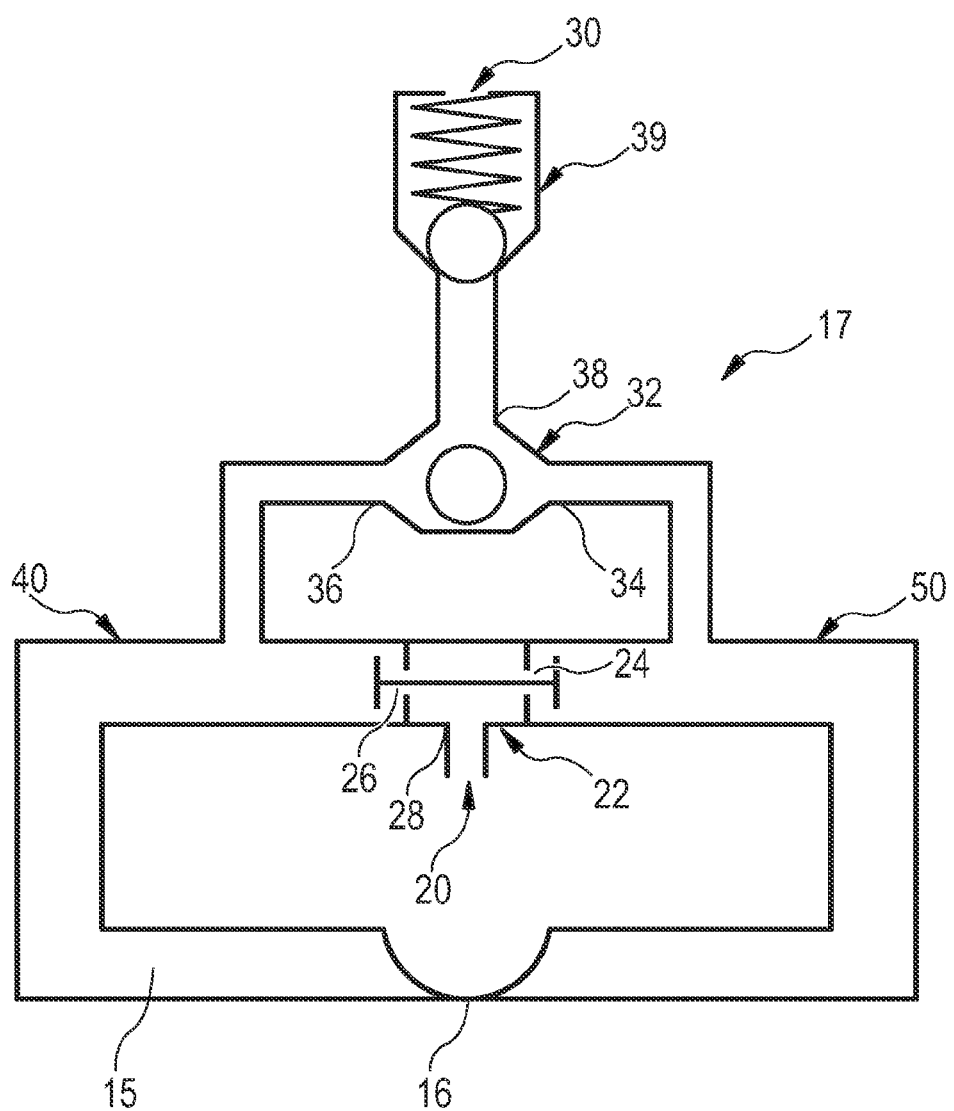
FIG. 3 shows a schematic diagram of elements allowing air to flow into a tire cavity.

FIG. 3 shows a schematic representation of components allowing the tire's inflation. It is emphasized that the depicted scheme is shown out of scale and has mainly the purpose of demonstrating the functional relationship of the air passageway 15, the valve assembly 17 and elements of that assembly 17, wherein elements already shown in FIGS. 1 and 2 are depicted with equal reference numerals.

The arrangement shown in FIG. 3 comprises the air passageway 15 deformed by a bending force in the footprint region 13. The valve assembly 17 comprises a first valve 22 and a second valve 32, wherein the first valve 22 is interposed in the airflow of the air passageway 15. This, however, does not require that the first valve 22 is arranged directly within a tube of the air passageway 15. Rather it may be connected to two ends of the air passageway 15 by conducting means like tubes or channels. The first valve 22 is further connected with an air inlet 20 which is in airflow communication with the external environment 19 of the tire 1. Further, the first valve 22 has a second opening 24 which is in air flow communication with one end of the annular air passageway and a third opening 26 which is in air flow communication with the second end of the annular air passageway 15. In particular, the valve 22 may switch between a first state and a second state, wherein in the first state, the second opening 24 is closed and the third opening 26 is open and wherein in the second state, the second opening 24 is open and the third opening 26 is closed. Preferably, in each state, the air inlet 20 is in an open state. The second valve 32 comprises also at least three openings, i.e. a fourth opening 38 in air flow communication with the outlet port 30, a fifth opening 34 in air flow communication with the second opening 24 and a sixth opening 36 in air flow communication with the third opening 26. In particular, the fifth and the second openings, as well as the sixth and the third openings are in direct air flow communication. In other words, preferably no other components, as e.g. further valves, are provided in the air flow between these openings.

As shown in FIG. 3, the outlet port 30 may further comprise a check or anti-return valve 39 avoiding air exiting the tire through the valve assembly 17. Check valves as such are known to the person skilled in the art and may have different designs. For example, they may be provided as ball valve, leaf valves, duckbill valves or sleeve valves.

Figure 4:
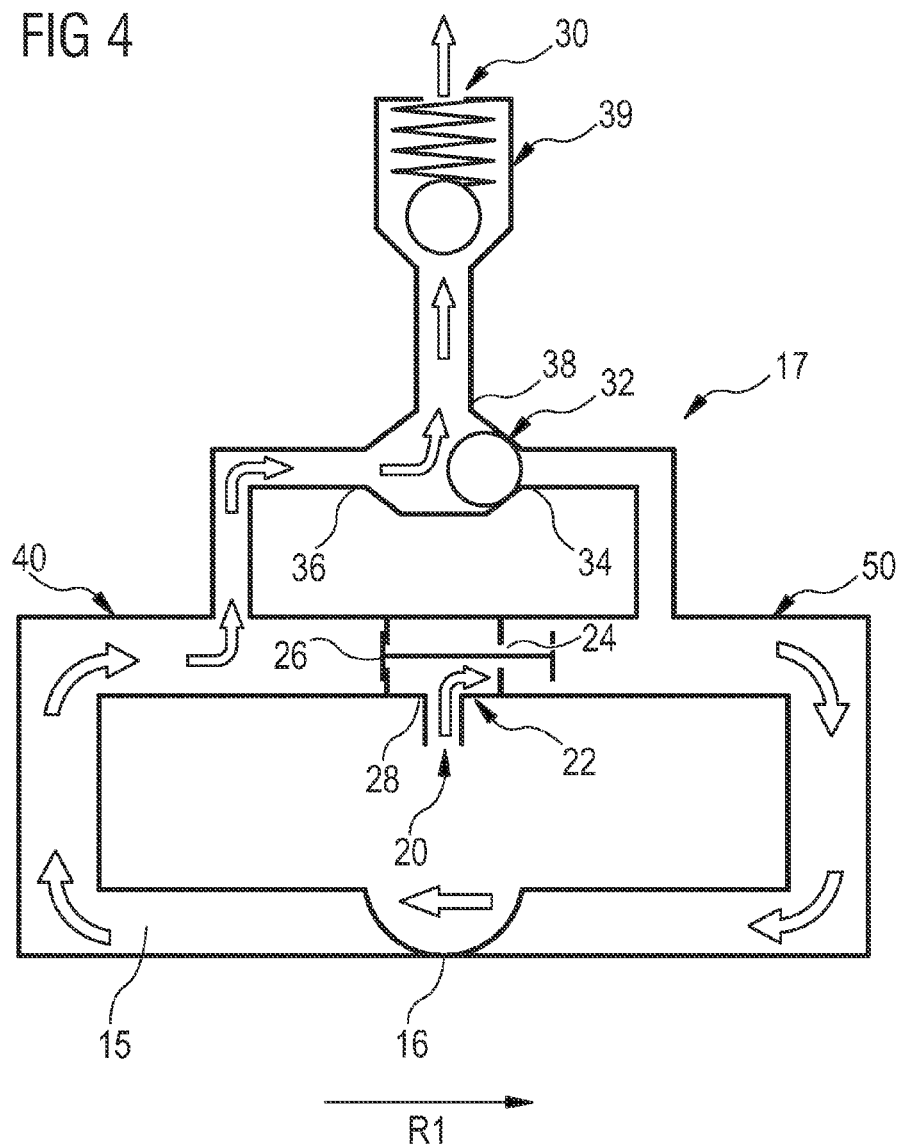
FIG. 4 shows a schematic diagram of elements allowing air to flow into a tire cavity rolling into a first direction.

In FIG. 4, the schematic representation of FIG. 3 is shown during pumping operation. Due to the tire's 1 rotation in direction R1, the assembly pumps air through the sixth opening 36, the fourth opening 38 and the outlet port 30 into the tire cavity 11. Due to a reduced pressure occurring in the right hand side of the depicted air passageway 15, air is sucked into the passageway 15 through the air inlet 20 and the second opening 24. The third opening 26 and the fifth opening 34 may automatically close in response to the pressure produced by the deformation of the air passageway on the one hand and the reduced pressure produced behind (upstream) the moving air passageway deformation 16 on the other hand.

Figure 5:
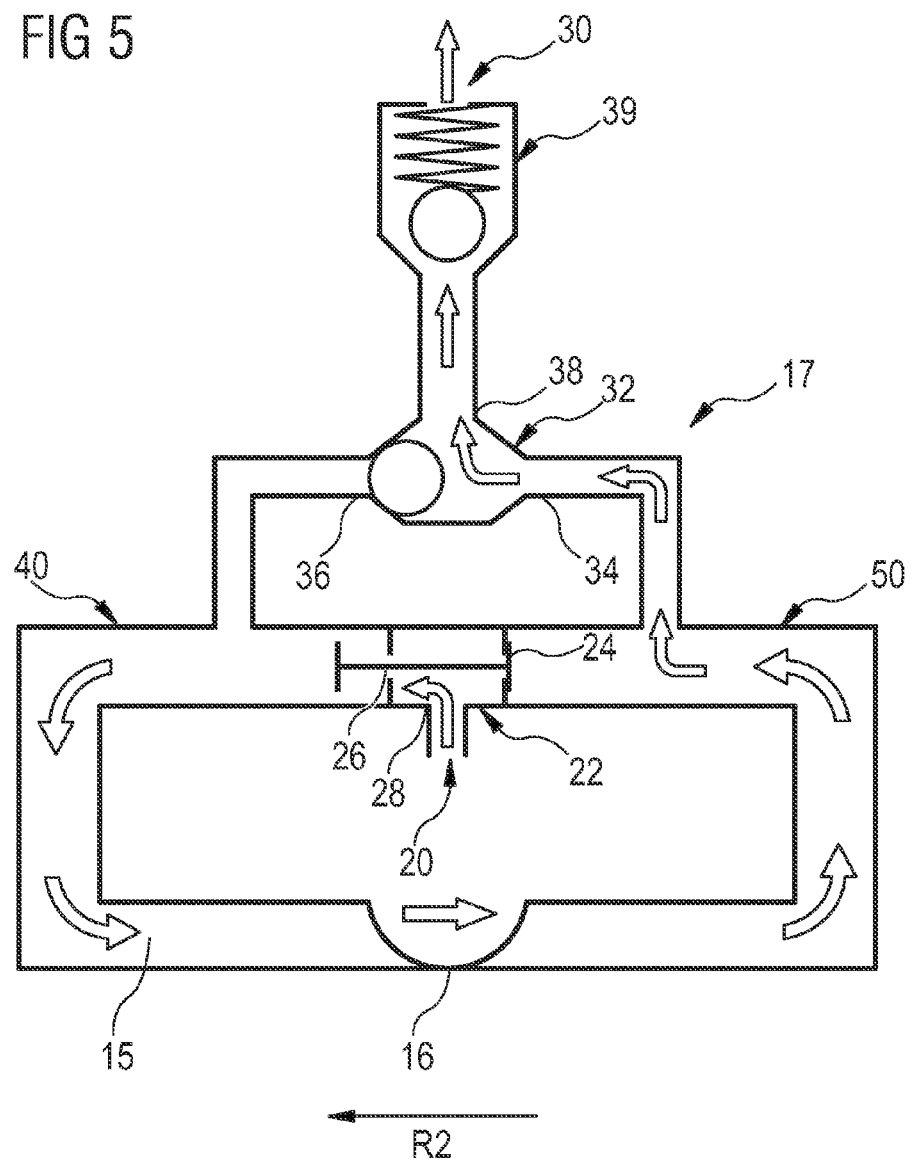
FIG. 5 shows a schematic diagram according to FIG. 4 but showing an air flow for a tire rolling into an opposite direction.

FIG. 5 shows the scheme according to FIG. 4 in a reverse rolling direction R2. Due to the tire's 1 rotation in direction R2, the assembly pumps air through the fifth opening 34, the fourth opening 38 and the outlet port 30 into the tire cavity 11. In view of a corresponding reduced pressure occurring upstream the deformation 16 on the left hand side of the depicted air passageway 15, air is sucked into the passageway 15 through the air inlet 20 and the third opening 26. The sixth opening 36 of the second valve 32 may automatically close in response to the pressure produced by the deformation 16 of the air passageway 15 on the one hand and the reduced pressure produced on the back side of the deformation 16 in the air passageway 15 on the other hand.

Figure 6:
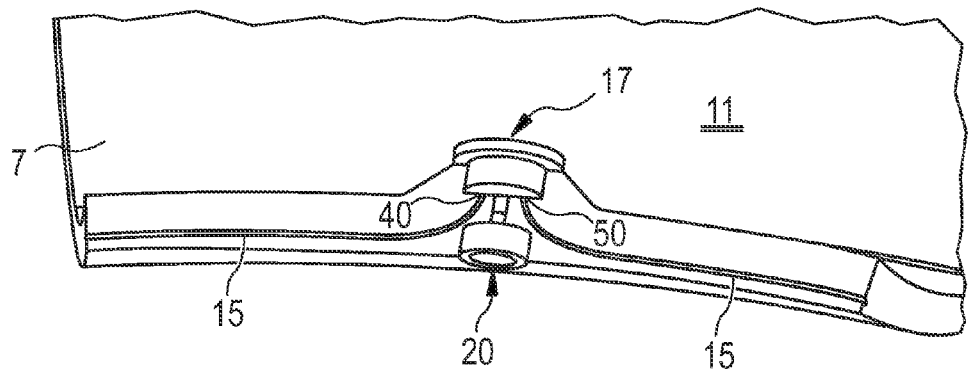
FIG. 6 shows a partial and cut three-dimensional view through a tire's sidewall.

FIG. 6 shows a partial cross-section through a tire's 1 sidewall 7 comprising an air passageway 15 extending essentially in a circumferential direction. The valve assembly 17 is interposed between two ends of the passageway 15 wherein the passageway 15 is connected to these ends by ports 40, 50. Further, the depicted valve assembly 17 comprises an air inlet 20 directed to the tire's 1 exterior. The air inlet 20 may comprise a filter. In particular, the air inlet 20 may be positioned on the outer surface of the sidewall (facing away from the tire cavity 11). The air outlet allowing an air flow to enter the tire cavity 11 is not visible in FIG. 6. It faces the tire cavity 11.

Figure 7:
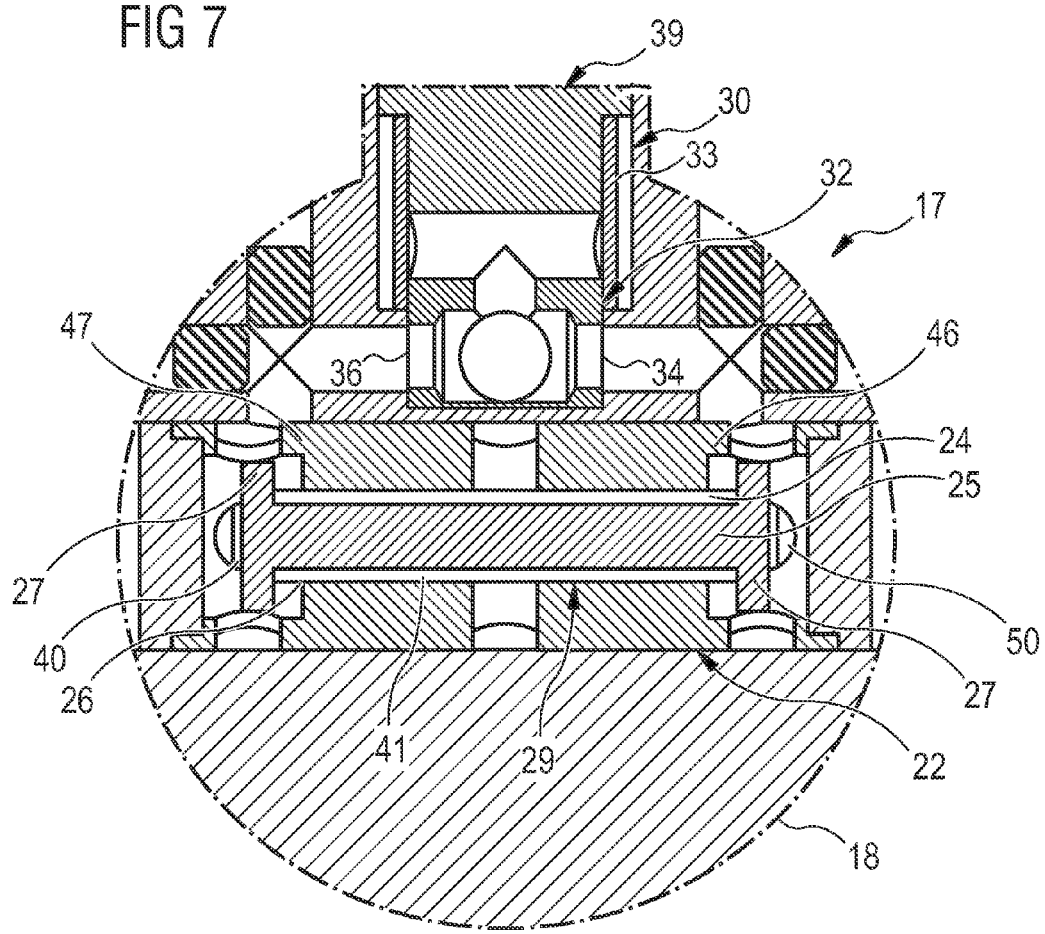
FIG. 7 shows a cross-section of a valve assembly comprising a first valve and a second valve in accordance with an example of the present invention.
Figure 8:
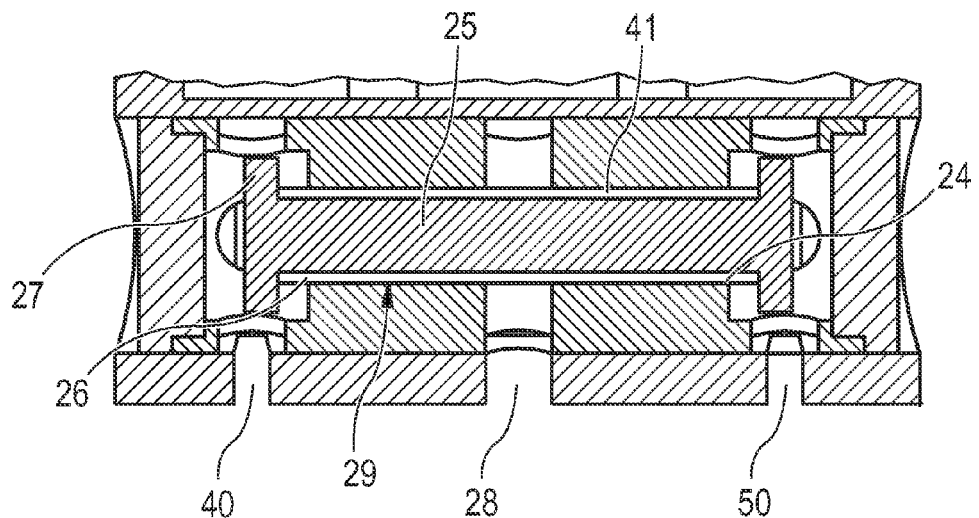
FIG. 8 shows a second cross-section of a first valve shown in FIG. 7, the second cross-section being perpendicular to the cross-section shown in FIG. 7.

FIG. 7 shows an example of a cross-section of a possible valve assembly 17. The valve assembly 17 comprises the first valve 22, the second valve 32, a check valve 39 and the air outlet 30. Preferably, these components are arranged in one valve body housing 18. The first valve 32 may comprise a chamber 29 having openings 24, 26 and 28, wherein air may pass through the opening 28 into the chamber 29 (opening 28 is not explicitly shown in FIG. 7). Further the chamber 29 may comprise a piston element 25 which may be moved between a first state in which it blocks air flow through the opening 24, and a second state, in which it blocks airflow through opening 26. Opening 24 may be in air flow communication with or connected to port 40 and opening 26 may be in air flow communication with or connected to port 50. Depending on the tire's rolling direction, port 40 may serve as air inlet port 40 and port 50 may serve as air outlet port 50, or vice versa. Further, opening 26 is in air flow communication with opening 36 of the second valve 32 and opening 24 is in air flow communication with opening 34 of the second valve 32. The chamber 29 may guide the movement of the piston element 25, in particular along an elongate axis of the piston element 25. As depicted in FIG. 8, opening 28 may be arranged between two end portions 27 of the piston element 25. An air flow entering the valve 22 or the chamber 29 through opening 28 may preferably be guided to one of openings 24 and 26 through channels or grooves 41 formed in the piston element 25. These grooves 41 are preferably formed in the elongate direction of a central portion of the piston element. Alternatively or in addition, grooves or channels could be provided in the wall of chamber 29. The end portions 27, arranged at opposite ends of the piston element 25 with respect to the elongate direction of the piston element 25, may have an essentially plate-like shape extending radially from the central portion of the piston element 25. In particular, the plate-shaped end portion 27 of the piston element 25 may block air flow from the grooves 41 through the second or third openings 24, 26 by movement of the piston element 25 in the elongate direction, wherein in the first state, the end portions 27 may abut on a corresponding end portion or a seat 46, 47 of the chamber 29 inhibiting air flow from the grooves 41 through the second opening 24. In the second state of the first valve 22, the opposite plate-shaped end portion 27 may abut on an end portion of the chamber 29 to inhibit air flow from the grooves 41 through the third opening 27.

Preferably, the piston element 25 extends essentially in a direction in parallel to the tire's circumferential direction which may improve the function of the first valve 22. It is emphasized that the piston element 25 may have a substantially circular cross-section. However, it may also have other cross-sections, as for example rectangular, star-shaped, oval or polygonal cross-sections.

FIG. 8 shows a detailed view of the first valve 22 in a cross-section perpendicular to that shown in FIG. 7. In particular, port 40 and port 50 connecting the first valve 22 to the ends of the air passageway 15 as well as the inlet opening 28 are clearly shown. The remaining elements of the first valve correspond to those already described with respect to FIG. 7. Although, the ports 40, 50 and the openings 28, 24, 26 are shown at specific positions, they could be located at other positions.

Figure 9:
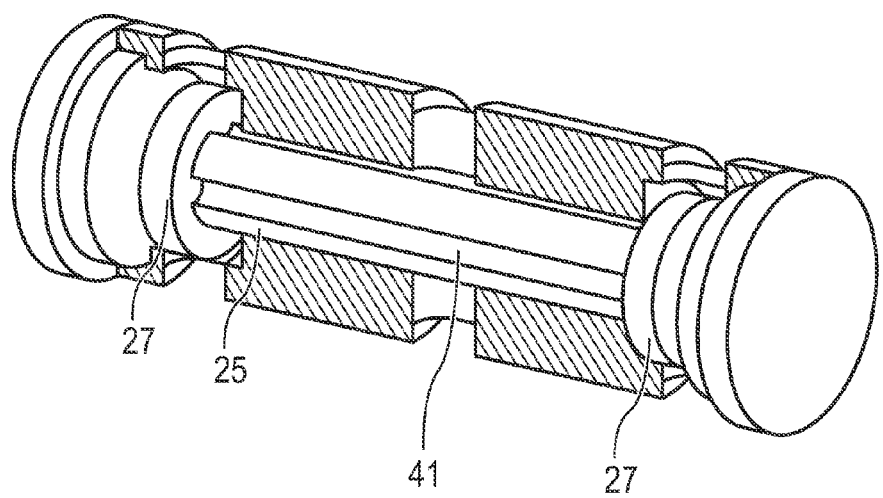
FIG. 9 shows a partial three-dimensional view of elements of the first valve depicted in FIGS. 7 and 8.

FIG. 9 represents a three-dimensional view of the piston element 25 comprising grooves 41, the central portion and two opposite end portions 27. The central portion of the piston element 25 extends through the chamber 29. The chamber 29 may comprise circumferential cut-outs, channels or grooves allowing air flow from the opening 28 into the grooves 41 of the piston element 25.

Figure 10:
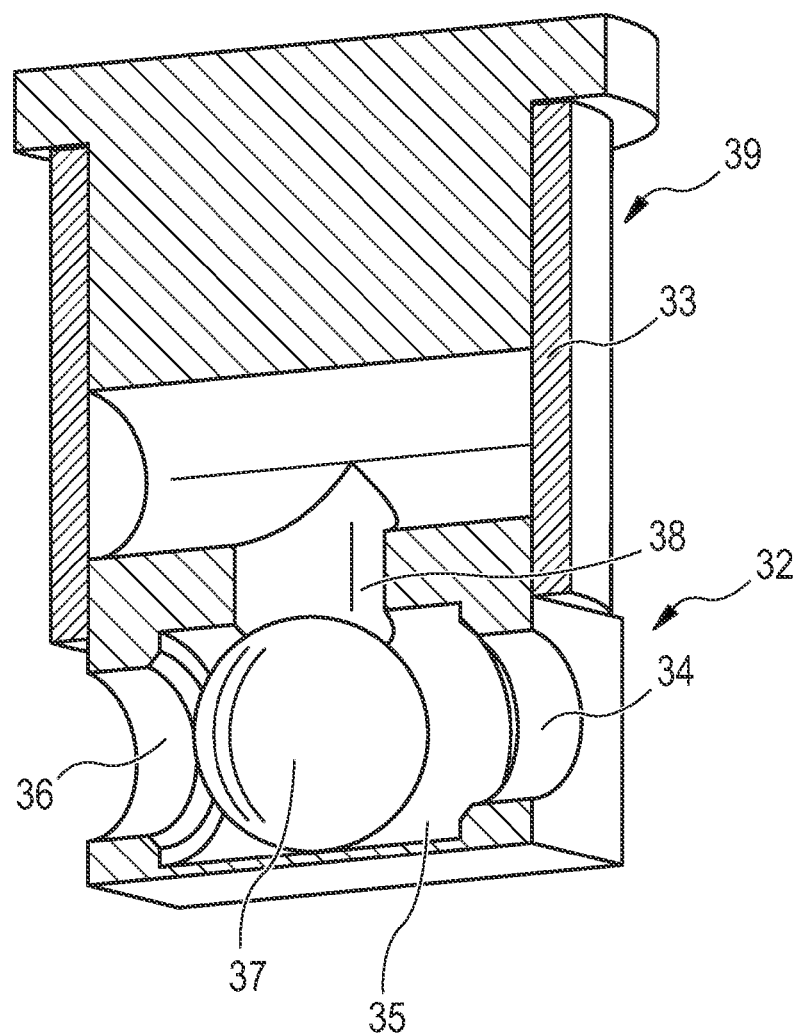
FIG. 10 shows a cut three-dimensional view of the second valve depicted in FIG. 7.

FIG. 10 represents a schematic partial three-dimensional view of the second valve 32 and the check valve 39 already depicted in FIG. 7. The second valve 32 comprises a chamber 35 having an outlet opening 38, a first inlet opening 34 and a second inlet opening 36. The chamber 35 may have a substantially cylindrical shape and may comprise a ball-shaped closing element 37. The ball-shaped closing element 37 may be adapted to close (selectively) either opening 34 or opening 36. When the closing element 37 closes opening 34 air may flow through opening 36 to opening 38, or, when closing element 37 closes opening 36, air may flow from opening 34 to opening 38. Preferably, openings 34 and 36 are arranged oppositely of each other. Opening 38 may, for instance, be arranged between openings 34 and 36. Instead of the ball-shaped element 37 the element could have a substantially cylindrical shape. As an example, check valve 39 may be implemented as a sleeve valve having a deformable or flexible sleeve 33. In particular, the sleeve 33 may have a substantially hollow cylindrical shape and may enclose a cylindrical portion or member of the check valve 39, wherein the cylindrical member may have one or more bores in air flow communication with the outlet opening 38 of the second valve 32 and the inner surface of the sleeve 33. The sleeve 33 may deform upon air pressure such that it blocks air flow from the tire cavity 11 into the second valve 32 when the tire is not rotating or, in other words, when air is not pumped through the annular passageway 15. If air is pumped through the air passageway 15, the deformable sleeve 33 is expanded and allows air to enter the tire cavity 11 through the air outlet 30.

Although the present invention has been described with respect to a preferred and advantageous embodiment including valves 22 and 32 as shown in FIGS. 7 to 10, the present invention is not limited to such designs. Other specific shapes and/or designs of valves 22, 32 may be suitable for allowing the function depicted in FIGS. 3 and 4, wherein several possible variations have been mentioned above.

The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof.

In any case the above described embodiments shall not be understood in a limiting sense. In particular, the features of the above embodiments may also be replaced or combined with one another.

The invention claimed is:
1. A pneumatic tire comprising:
a tire cavity, first and second sidewalls extending respectively from first and second tire bead regions to a tire tread region;
an elongate, substantially annular air passageway enclosed within a bending region of the tire and extending substantially in a circumferential direction of the tire, wherein upon rolling of the tire air is pressed through the air passageway; and
a valve assembly in air flow communication with the tire cavity, the annular air passageway and an exterior of the tire, the valve assembly comprising:
an air inlet for allowing air to enter the valve assembly from the exterior of the tire;
an air outlet for allowing air to enter the tire cavity;
a first valve interposed in the air flow of the air passageway, the first valve having a first position allowing air to enter the air passageway through the air inlet in a first flow direction and a second position allowing air to enter the air passageway through the air inlet in a second flow direction opposite to the first direction, wherein the first valve comprises:

a first chamber having a first opening in air flow communication with the air inlet and a second opening in air flow communication with a first end of the annular passageway and a third opening in air flow communication with a second end of the annular passageway; and a piston element adapted and arranged to move between a first state blocking air flow through the second opening and allowing air flow from the first opening through the third opening and a second state blocking air flow through the third opening and allowing air flow from the first opening through the second opening; and a second valve interposed in the air flow of the air passageway in parallel to the first valve, wherein when the first valve is in the first position, the second valve is in a third position allowing air flowing through the air passageway in the first flow direction to exit the air passageway through the air outlet, and wherein when the first valve is in the second position, the second valve is in a fourth position allowing air flowing through the air passageway in the second flow direction to exit the air passageway through the air outlet.

2. The tire according to claim 1, wherein the air passageway extends annularly within the first or the second sidewall or the first or the second bead region.

3. The tire according to claim 1, further comprising: a valve body housing, wherein the first valve and the second valve are arranged in the valve body housing.

4. The tire according to claim 3, wherein the air outlet or the air inlet is arranged in the valve body housing.

5. The tire according to claim 1, wherein the valves change between the first, second, third or fourth position self-reliantly in dependency of the direction of the air flow through the air passageway dictated by a rolling direction of the tire.

6. The tire according to claim 1, wherein the valve assembly extends through the first or the second sidewall or the first or the second bead region.

7. The tire according to claim 1, wherein the chamber and the piston element have each a substantially elongate cylindrical shape, the piston element being movable along its elongate axis, and wherein the second and the third openings are arranged at opposite end regions of the first chamber and wherein the first opening is arranged in a sidewall of the chamber.

8. The tire according to claim 1, wherein the piston element has an elongate cylindrical central portion and two essentially plate-shaped end portions extending radially from the cylindrical central portion, the plate-shaped end portions being sized to block air flow through the second or third opening.

9. The tire according to claim 8, wherein the first chamber encompasses and guides the central cylindrical portion along its elongate direction, the central cylindrical portion comprising grooves extending along the elongate direction, and wherein the first chamber comprises a channel allowing air flow to pass from the first opening into the grooves.

10. The tire according to claim 8, wherein one plate-shaped end portion closes the second opening but allows air flow from the first opening through the third opening when the first valve is in the first position, whereas, when the first valve is in the second position, the other plate-shaped end portion closes the third opening but allows air flow from the first opening through the second opening.

11. The tire according to claim 8, wherein the first chamber comprises at each of its end regions a seat for accommodating the plate-shaped end portions of the piston element such that, when the first valve is in the first state, one plate-shaped end portion sits in a first seat thereby closing the second opening but allowing air flow from the first opening through the third opening, whereas, when the first valve is in the second state, the other plate-shaped end portion sits in a second seat thereby closing the third opening but allowing air flow from the first opening through the second opening.

12. The tire according to claim 1, wherein the second opening is in direct air flow communication with the first end of the air passageway and wherein the third opening is in direct air flow communication with second end of the air passageway.

13. The tire according to claim 1, wherein the second valve comprises:
a second chamber having a fourth opening in air flow communication with the air outlet and a fifth opening in air flow communication with the second opening of the first valve and a sixth opening being in air flow communication with the third opening of the first valve; and
a closing element adapted and arranged to move between a third state closing the fifth opening and allowing air flow from the sixth opening through the fourth opening and a fourth state closing the sixth opening and allowing air flow from the fifth opening through the fourth opening.

14. The tire according to claim 13, wherein the second valve comprises a substantially cylindrical chamber, and wherein the closing element has a cylindrical shape or a ball shape.

15. The tire according to claim 1, wherein the valve assembly comprises a check valve for avoiding pressure drop in the tire cavity and to prevent air flow from the tire cavity into the second valve.

16. A pneumatic tire comprising:
a tire cavity, first and second sidewalls extending respectively from first and second tire bead regions to a tire tread region;
an elongate, substantially annular air passageway enclosed within a bending region of the tire and extending substantially in a circumferential direction of the tire, wherein upon rolling of the tire air is pressed through the air passageway; and
a valve assembly in air flow communication with the tire cavity, the annular air passageway and an exterior of the tire, the valve assembly comprising:
an air inlet for allowing air to enter the valve assembly from an exterior of the tire;
an air outlet for allowing air to enter the tire cavity;
a first valve interposed in the air flow of the air passageway, the first valve having a first position allowing air to enter the air passageway through the air inlet in a first flow direction and a second position allowing air to enter the air passageway through the air inlet in a second flow direction opposite to the first direction;
wherein the first valve comprises:
a first chamber having a first opening in air flow communication with the air inlet and a second opening in air flow communication with a first end of the annular passageway and a third opening in air flow communication with a second end of the annular passageway, and
a piston element adapted and arranged to move between a first state blocking air flow through the second opening and allowing air flow from the first opening through the third opening and a second state blocking air flow through the third opening and allowing air flow from the first opening through the second opening;

a second valve interposed in the air flow of the air passageway in parallel to the first valve, wherein when the first valve is in the first position, the second valve is in a third position allowing air flowing through the air passageway in the first flow direction to exit the air passageway through the air outlet, and wherein when the first valve is in the second position, the second valve is in a fourth position allowing air flowing through the air passageway in the second flow direction to exit the air passageway through the air outlet;

wherein the second valve comprises:

a second chamber having a fourth opening in air flow communication with the air outlet and a fifth opening in air flow communication with the second opening of the first valve and a sixth opening being in air flow communication with the third opening of the first valve; and a closing element adapted and arranged to move between a third state closing the fifth opening and allowing air flow from the sixth opening through the fourth opening and a fourth state closing the sixth opening and allowing air flow from the fifth opening through the fourth opening.

17. The tire according to claim 16, wherein the second opening is in direct air flow communication with the fifth opening and wherein the third opening is in direct air flow communication with the sixth opening.

18. The tire according to claim 16, wherein the fifth opening is in direct air flow communication with the first end of the air passageway and wherein the sixth opening is in direct air flow communication with the second end of the air passageway.

* * * * *